United States Patent [19]

Hope, deceased et al.

[11] Patent Number: 5,057,385

[45] Date of Patent: Oct. 15, 1991

[54] BATTERY PACKAGING CONSTRUCTION

[76] Inventors: Henry F. Hope, deceased, late of Huntingdon Valley; by Hazel Hope, executrix; Stephen F. Hope, both of c/o Hope Industries, Inc., Willow Grove, Pa. 19090

[21] Appl. No.: 627,406

[22] Filed: Dec. 14, 1990

[51] Int. Cl.[5] .............................................. H01M 2/02
[52] U.S. Cl. ..................................... 429/162; 429/163
[58] Field of Search ................ 429/162, 163, 185, 191, 429/192

[56] References Cited

U.S. PATENT DOCUMENTS

| | | | |
|---|---|---|---|
| 3,060,256 | 10/1962 | Paulson | 429/162 |
| 3,708,340 | 1/1973 | Tamminen | 429/162 X |
| 3,871,921 | 3/1975 | Beatty et al. | 429/162 X |
| 3,884,723 | 5/1975 | Wuttre | 429/162 |
| 4,137,627 | 2/1979 | Kinsman | 429/162 X |
| 4,172,319 | 10/1979 | Bloom et al. | 429/152 X |
| 4,609,597 | 9/1986 | Plasse | 429/122 |
| 4,623,598 | 11/1986 | Waki et al. | 429/162 |

Primary Examiner—Anthony Skapars
Attorney, Agent, or Firm—Z. T. Wobensmith, III

[57] ABSTRACT

Battery packaging construction for batteries of flat configuration which includes a first layer of heat sealable plastic coated metal foil. A battery on top of the first layer with a second layer of heat sealable plastic coated metal foil on top of and facing the battery which plastic layers are heat sealed under vacuum. An optional frame may surround the battery on top of the second layer, which frame is adhesively secured to the second layer, filler material is placed around the frame and the foil and cured by ultra violet light or electron beam, a third layer is adhesively secured to the frame and a label layer is placed on the third layer.

Terminals of flat metal foil extend from the battery out between the first and second foil layers over and under the base and are secured to the bottom layer. An elongated base plate may optionally be provided which has the layer of adhesively secured foil on the bottom, and the first layer of adhesively secured foil on the top surface of the base.

8 Claims, 1 Drawing Sheet

BATTERY PACKAGING CONSTRUCTION

BACKGROUND OF THE INVENTION

1. Field of the Invention

Battery packaging construction of the type wherein a flat battery is surrounded with various layers of protective material, and may be secured to a rigid base.

2. Description of the Prior Art

With batteries and particularly those of the solid state lithium metal type there are several goals to be achieved. The completed battery must be lightweight, and must withstand design shocks which result from shipping, storing and use. The packaging materials must be inexpensive and easily applied to the battery, must not react with the battery component materials, and produce a package that can be inexpensively assembled on production machinery. The most common types of packaging usually include an outer shell of stainless steel which surrounds the battery components. While the stainless shell construction is satisfactory in many respects it is bulky and expensive, results in increased weight, and does not provide adequate sealing. The battery packaging construction of the invention does not suffer from thhe prior art problems and provides many positive advantages.

SUMMARY OF THE INVENTION

This invention relates to battery packaging construction for flat batteries which construction includes various layers of protective materials which layers surround the battery and which additionally may be provided with a flat rigid base.

The principal object of the invention is to provide battery packaging construction for batteries which is protective, durable and lightweight.

A further object of the invention is to provide battery packaging construction that is particularly suitable for flat or wafer like batteries.

A further object of the invention is to provide battery packaging of the character aforesaid which is suitable for fragile batteries.

A further object of the invention is to provide battery packaging of the character aforesaid which is inexpensive and can be easily mass produced.

Other objects and advantageous features of the invention will be apparent from the description and claims.

DESCRIPTION OF THE DRAWINGS

The nature and characteristic features of the invention will be more readily understood from the following description taken in connection with the accompanying drawing forming part hereof in which.

Figure 1:
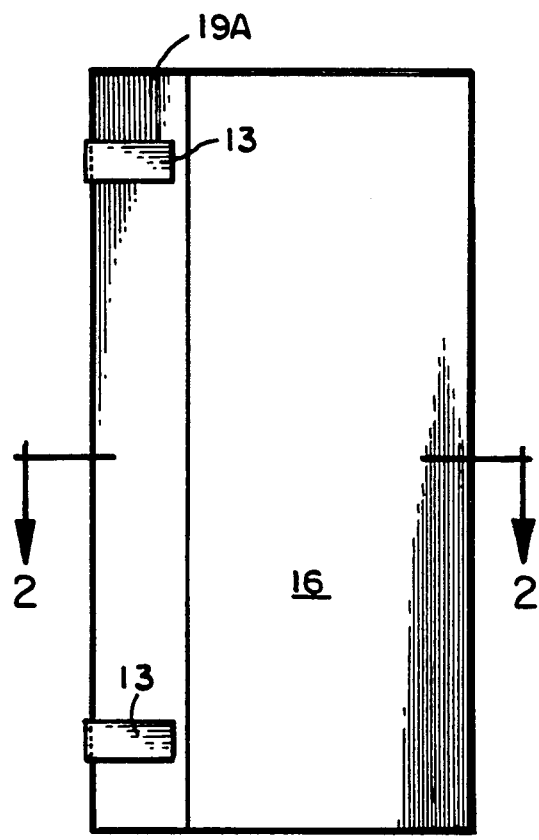
FIG. 1 is a bottom plan view of an embodiment of the battery packaging construction of the invention.
Figure 2:
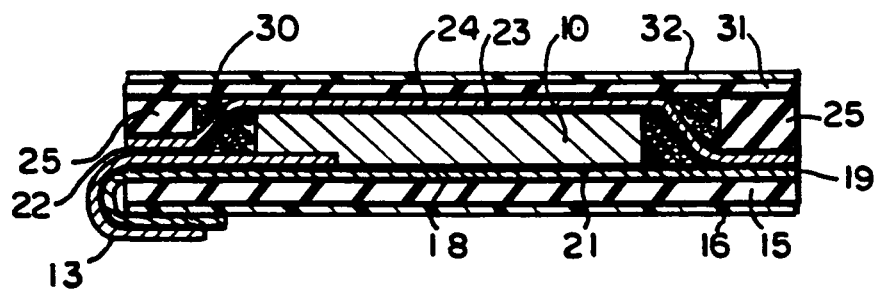
FIG. 2 is a vertical sectional view taken approximately on the line 2—2 of FIG. 1.

It should, of course, be understood that the description and drawings herein are merely illustrative and that various modifications and changes can be made in the structures disclosed without departing from the spirit of the invention.

Like numerals refer to like parts throughout the several views.

DESCRIPTION OF THE PREFERRED EMBODIMENT

Referring now more particularly to the drawings, a battery 10 is therein illustrated which may be of the alkaline metal or alkaline earth metal type. the battery 10 includes an anode, cathode and electrolyte (not shown) and has been assembled into a solid block which may be of rectangular configuration, with flat top and bottom surfaces 11 and 12, and with terminals 13 preferably of flat nickel metal foil extending therefrom.

The embodiment of packaging construction illustrated includes a flat rigid base 15, which can be of paper such as nomex, of a 0.01 to 0.02 inch thickness, or of a metal sheet of aluminum or magnesium of a thickness of 10 mils. The base 15 is optional and the packaging construction does not require a rigid base.

The base 15 has an outer layer 16 on its bottom surface 17 which can be of metalized mylar plastic, which has a contact adhesive coating (not shown) thereon of well known type. The base 15 has a top surface 18, with a first layer 19 of metal foil, such as aluminium, which has a layer 21 of heat sealable material thereon such as polyethylene on its upper side and an epoxy cement or contact adhesive coating (not shown) facing base 15 to secure it thereto.

The battery 10 is located on top of the polyethene layer 21 and has a second layer 23 of metal foil on top which has a layer 24 of heat sealable material thereon such as polyethylene on the surface facing the battery 10.

It should be noted that the layer 19 is wider than base 15, and is folded down under and secured to outer layer 16 with the terminals 13 glued underneath and insulated from the bottom layer 16 by the polyethlene on the first layer 19.

A frame 25 of rectangular configuration is provided, preferably of pulp paper of the same thickness as battery 10 and which is secured to the layer 23 by epoxy cement 22 of well known type. A filler strip 30 of epoxy cement of well known type is provided around frame 25 to fill and seal it to layer 23, and which may contain a plurality of hollow spheres (not shown) which may be of glass or other well known lightweight filler material as desired.

A third layer 31, which may be of paper, such as nomex with a thickness of 0.007 inches and with a contact adhesive coating thereon (not shown) is placed over frame 25 and layer 23. A label layer 32 is provided over third layer 31, which has a contact adhesive thereon (not shown) and which label may be of metalized mylar plastic.

The embodiment of packaging construction as illustrated is preferably assembled as follows:

The base 15 has the outer layer 16 applied thereto and the first layer 19, which is wider then the base 15 glued thereto by epoxy or contact glue of well known type, with the polyethylene layer 21 facing away from the base 15.

A battery 10 is placed on the polyethylene layer 21 of first layer 19, with the terminals 13, thereon with a portion 19A of layer 19 which is folded under and glued to the base 15 by epoxy or contact cement of well known type.

The second layer 23 is placed on the battery 10 and first layer 19 with the polyethylene layer 24 facing the polyethylene coating 21, which are placed in a vacuum chamber (not shown) in which a vacuum is formed, and mechanical pressure and heat are provided to fuse the polyethylene layer 21 and 24 to seal the battery 10 all around. The vacuum chamber (not shown) is then filled with inert gas at atmospheric pressure. The frame 25 is placed over the battery and then glued by epoxy cement to the layer 23. A filler strip 30 of epoxy cement which is preferably mixed with a plurality of hollow glass spheres, is placed around the frame 25 adjacent the battery 10 in order to fill and seal the frame 25 to layer 23. It should be noted that if desired ultra-violet light or electron beam curable filler material for strip 30 can also be used. A third layer 31 is then applied to layer 23 and frame 25. The label layer 32 is then applied to third layer 31 to complete the packaging construction.

It will thus be seen that battery packaging construction has been provided in accordance with the objects of the invention.

We claim:

1. Battery packaging construction for packaging of flat alkaline metal or alkaline earth metal batteries which comprises
    a first layer of metal foil having top and bottom surfaces,
    said first layer having a layer of heat sealable plastic on its top surface,
    a battery on said layer of heat sealable plastic,
    a second layer of metal foil on and extending over said battery,
    a heat sealable plastic layer on said second layer which faces and is in contact with said battery and said heat sealable layer on said first layer whereby said plastic layers can be heat sealed to enclose and contain said battery.

2. Battery packaging construction as defined in claim 1 in which
    a flat rigid base having top and bottom surfaces is provided to which said first layer of metal foil is adhesively secured, and
    an outer layer adhesively secured to said bottom surface of said base.

3. Battery packaging construction as defined in claim 1 in which
    a frame is provided on said other surface of said second layer and around said battery, and
    filler means around said frame adjacent said second layer and said battery.

4. Battery packaging construction as defined in claim 3 in which
    a third layer is provided overlying said frame and said second layer in adhesive contact therewith, and with
    a label layer in adhesive contact with said third layer.

5. Battery packaging construction as defined in claim 3 in which
    said filler means is comprised of cement and a plurality of hollow spheres.

6. Battery packaging construction as defined in claim 3 in which
    said filler means is ultra-violet light curable.

7. Battery packaging construction as defined in claim 3 in which
    said filler means is electron beam curable.

8. Battery packaging construction as defined in claim 1 in which
    said heat sealable plastic is polyethlene.

* * * * *